Figure 1:
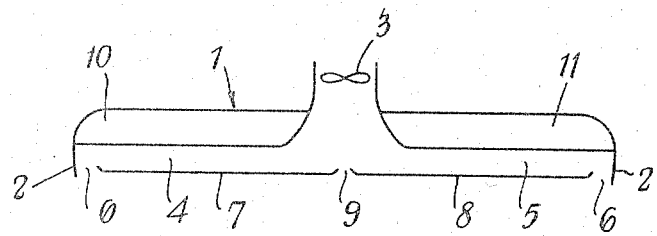

3,302,738
AIR-CUSHION BORNE VEHICLES
Alan Edgar Bingham, Swindon, England, assignor to Vickers-Armstrongs (Engineers) Limited, Millbank, London, England, a British company
Filed Mar. 31, 1964, Ser. No. 356,307
Claims priority, application Great Britain, Aug. 5, 1963, 13,761/63
3 Claims. (Cl. 180—7)

This invention relates to air cushion borne vehicles.

According to the present invention there is provided an air cushion borne vehicle comprising a body, a skirt depending from the underside and along the periphery of the body, and panelling spaced from the underside of the body to form therewith ducting for directing air from an air supply to an opening formed between the skirt and the panelling, the opening extending along the periphery of said body, the arrangement being such that, when air is supplied to the ducting and the vehicle is supported on an air cushion beneath the panelling, air leakage from said cushion is minimised by an air curtain formed by the air which issues downwardly through said opening.

For a better understanding of the present invention and to show how the same may be carried into effect, reference will now be made, by way of example, to the accompanying drawings, in which the eight figures are diagrammatic sectional elevations of eight different forms of air cushion borne vehicles for use over water.

Each of the vehicles shown in FIGURE 1 and FIGURES 3 to 8 has a body 1 from around the periphery of which depends a flexible skirt 2. A fan 3 is provided on each body 1 and is arranged to deliver air through horizontal ducts 4, 5 to an opening 6 adjacent the inside of the bottom of the skirt 2 and extending around the periphery of the body 1. The upper walls of the ducts 4 and 5 are defined by the underside of the vehicle body 1 and the lower walls by panels 7 and 8. The panels 7 and 8 are spaced from the skirt 2 to define therewith the opening 6 and from each other to form a slot 9 extending across the vehicle. Buoyancy chambers 10, 11 are provided on the body 1 above the ducts 4, 5 for supporting the vehicle on water when the fan 3 is not in operation.

Figure 2:
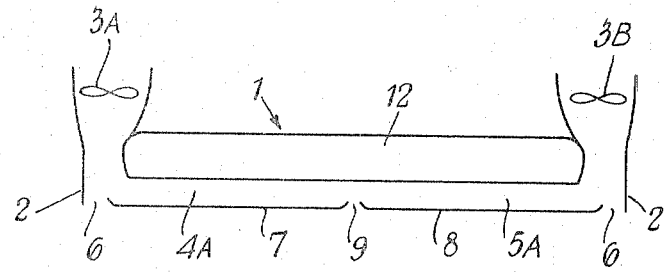

The vehicle of FIGURE 2 differs from that of FIGURE 1 in that it has two fans 3A, 3B one at each end of the body 1, with a buoyancy chamber 12 between them extending almost the whole length of the vehicle. Ducts 4A, 5A lead part of the air supply from the fans 3A, 3B towards the slot 9.

Figure 3:
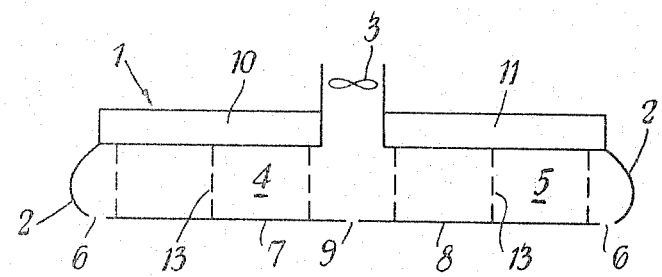

The panels 7 and 8 of the vehicle of FIGURE 3 are supported by vertically extending ties 13 attached to the underside of the body 1. The ties 13 are flexible as are the panels 7 and 8.

Figure 4:
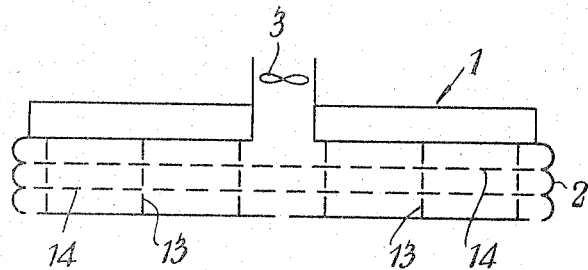

The vehicle of FIGURE 4 is similar to that of FIGURE 3 except that its skirt 2 is formed with horizontally extending convolutions, the inwardly extending ridges of one side section of the skirt 2 being joined by horizontally extending ties 14 to the corresponding inwardly extending ridges of the opposite side section of the skirt 2. The ties 14 serve to prevent the skirt 2 spreading.

Figure 5:
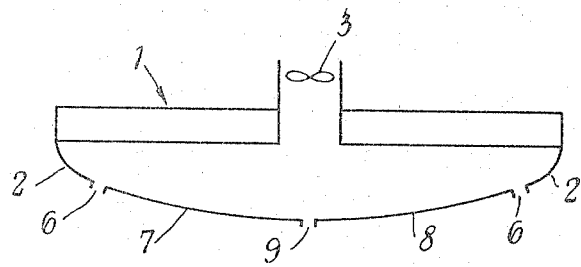

The vehicle of FIGURE 5 has a skirt 2 and panels 7 and 8 formed from a single flexible sheet suspended from the periphery of the vehicle. The openings 6 and 9 are cut out from this sheet leaving bridge pieces (not shown) across those openings to retain the panels 7 and 8. The vehicle illustrated has no ties but in a modification ties may be provided to support the middle part of the sheet, as in FIGURES 3 and 4.

Figure 6:
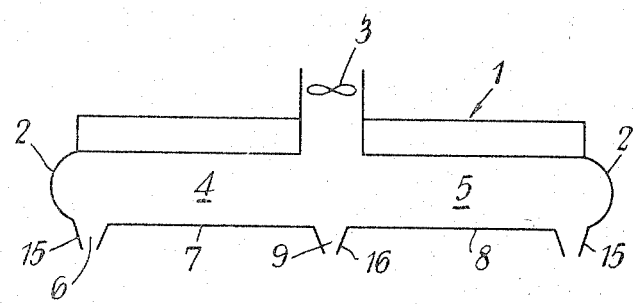

The vehicle shown in FIGURE 6 has downwardly directed extensions 15 and 16 from the edge portions of the skirt 2 and the panels 7 and 8 at the opening 6 and at the slot 9 respectively. These extensions are formed of flexible material and are deformable upon impact with the surface over which the vehicle is travelling. The extensions 15 and 16 extend the ducts 4 and 5 to direct the air jets downwardly.

The vehicle of FIGURE 7 has a skirt 2 formed with two convolutions, folds or plaits 2A, 2B, the skirt normally depending below the panels 7 and 8 and assuming the position shown in the right hand side of FIGURE 7. The inwardly extending ridge joining the folds 2A and 2B of the skirt 2 is connected to the panels 7 or 8 by ties 17 which are attached to the panel at points spaced from the outer edge of the panel. The parts of the panels 7, 8 outside the points to which the ties 17 are attached are in the form of flaps 7A, 8A extending downwardly and outwardly, and the edges of these flaps are connected to the bottom edge of the skirt 2 by ties 18 spanning the opening 6. Since, as stated above the lower edge of the skirt, that is, of the fold 2B, extends below the panels 7 and 8, this inturned lower edge of the fold 2B and the adjacent edge of the downwardly-extending members 7A–8A direct a stream of air downwardly and inwardly below the panels 7 and 8. The upper convolution 2A of the skirt is made more flexible than the bottom convolution 2B so that when the bottom of the skirt is lifted, the skirt folds in the manner shown in the left hand side of FIGURE 7.

Figure 7:
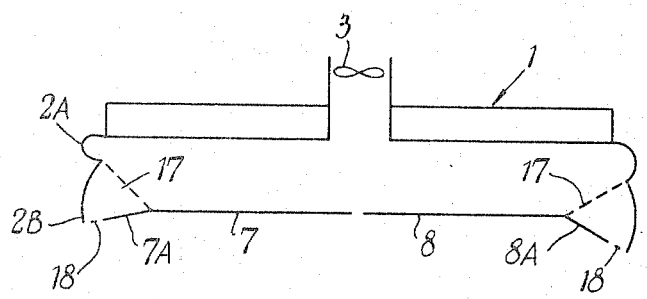
Figure 8:
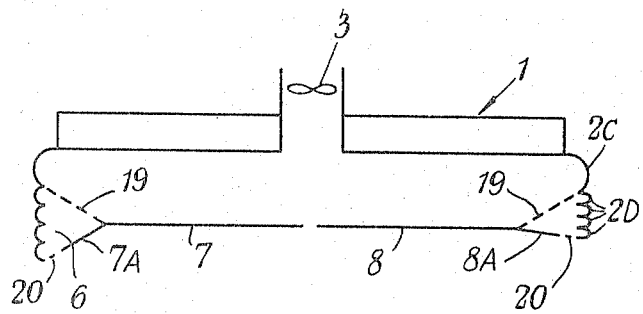

The vehicle shown in FIGURE 8 has a skirt 2 formed with a large upper convolution 2C and a series of smaller convolutions 2D towards the bottom edge of the skirt. Ties 19 connect the inwardly extending ridges at the bottom of the larger upper convolution 2C to points of the panels 7 and 8 in the manner of the ties 17 of the vehicle of FIGURE 7. The panels 7 and 8 also have flaps 7A, 8A and these are joined at their free edges to the bottom edge of the skirt 2 by ties 20 spanning the opening 6. When the skirt 2 is lifted from the position shown in the left hand side of FIGURE 8, the latter folds in a manner shown in the right hand side of FIGURE 8. Ties (not shown) may be provided joining the inwardly extending ridges of the smaller convolutions 2D to points on the hinge axes of the flaps 7A and 8A. The upper convolution 2C may be constructed to fold simultaneously with the smaller convolutions 2D.

Lifting of the skirt of any of the described vehicles may be performed manually or may be caused by the skirt encountering an obstruction. Alternatively control devices (not shown) may be provided for effecting the lifting.

The panels 7 and 8 or the sheet providing the panels and ducting are preferably flexible and, therefore, deformable upon impact of the vehicle with water. The panels 7 and 8 may also be arranged to be removable from the body 1 for the purposes of inspection or repair. The arrangement of the panels 7 and 8 below the body 1 affords protection from the impact of water for the buoyancy chambers.

In a modification (not shown) of any one of the described vehicles, the portions of the flexible skirt 2 at the longitudinal sides of the vehicles are replaced by rigid side walls depending from the longitudinal sides of the body 1.

In modifications (not shown) of the vehicles of FIGURE 3 and FIGURE 4, the ties 13 are inextensible and are connected to a motor operable to retract and lower the panels 7 and 8 through the intermediary of the ties 13. The middle part of the flexible sheet of the vehicle of FIGURE 5 may be similarly controlled.

In a further modification (not shown) of the vehicle of FIGURE 4, transverse ties equivalent to the ties 14 are connected to the bottom of the vehicle at or near the centre line thereof. Such an arrangement prevents simultaneous sideways movement of opposite side portions of the skirt 2 in the same direction relative to the body 1, which movement is possible with the vehicle of FIGURE 4.

In a modification (not shown) of the vehicle of FIGURE 7, the convolution 2A is not made more flexible then than the convolution 2B so that both convolutions can fold simultaneously.

The slot 9 is not essential to all the embodiments described above and variants (not shown) of the vehicles described may have no such slot, a plurality of them, or shorter slots not extending the width or length of the vehicle. The vehicle described may in addition be provided with wheels and/or buoyant side walls. It will be understood that the vehicles of FIGURES 3 to 8 may be modified by having two fans and a single buoyancy chamber similar to the vehicle of FIGURE 2. More fans may be provided if desired.

In operation of each of the above-described vehicles, air is forced by the fan or fans in downwardly directed jets through the peripheral opening 6 and through the slot 9, if the latter exists. The air issuing from the opening 6 forms an air curtain encircling the space beneath the body 1, this space filling with air at above atmospheric pressure to form an air cushion that at least partially supports the vehicle, the air curtain minimising leakage of air laterally from the cushion. For vehicles with a slot 9, the jet issuing from that slot forms an air curtain within the cushion, this curtain compartmenting the cushion for vehicle stability purposes.

It will be understood that instead of providing a fan or fans on the vehicle itself, the vehicle may be a trailer with the air for supporting it supplied from the towing vehicle through a connecting flexible pipe. Also, if the vehicle is to be used solely on overland routes, the buoyancy chamber or chambers need not be provided.

I claim:

1. An air-cushion borne vehicle comprising a body, a skirt of flexible material depending from the underside and along the peripheral portion of the vehicle body, said flexible skirt being made up of horizontally-extending convolutions or folds to provide a plaited type structure, the uppermost convolution being more flexible than the lower convolution, panelling entirely of flexible material located within the confines of the skirt and spaced from the underside of the vehicle body to form therewith ducting for leading air to the peripheral portion of the vehicle adjacent to the skirt, said panelling being supported in a position so that the lower edge of the bottom fold of the skirt extends below the level of the panelling, downwardly directed flexible portions of the panelling around the periphery thereof extending downwardly and outwardly so that their outer edges are adjacent to the lower edge of the bottom fold of the skirt, to define therewith an opening for directing air in a downward jet stream thereby forming an air curtain along the periphery of the vehicle skirt, means for securing the portions of the panelling to the skirt and means on the vehicle for directing air from an air supply into said ducting.

2. A vehicle as claimed in claim 1, wherein said means for securing the portions to the skirt comprise ties joining the lower edge of the bottom fold of the skirt to the outer edges of said downwardly and outwardly-extending portions.

3. A vehicle as claimed in claim 1, wherein adjacent folds of the skirt form an inwardly-extending ridge, and ties joining points along said ridge to points on the panelling from which said downwardly and outwardly-extending portions project.

References Cited by the Examiner

UNITED STATES PATENTS

| 2,988,303 | 6/1961 | Coanada. | |
| 3,042,129 | 7/1962 | Wade | 180—7 |
| 3,139,947 | 7/1964 | Bearsdley | 180—7 |
| 3,161,171 | 12/1964 | Ljungstrom | 180—7 |
| 3,174,569 | 3/1965 | Eggington | 180—7 |

FOREIGN PATENTS

| 1,325,473 | 3/1963 | France. |

A. HARRY LEVY, *Primary Examiner.*

BENJAMIN HERSH, *Examiner.*

M. S. SALES, *Assistant Examiner.*